Figure 3:
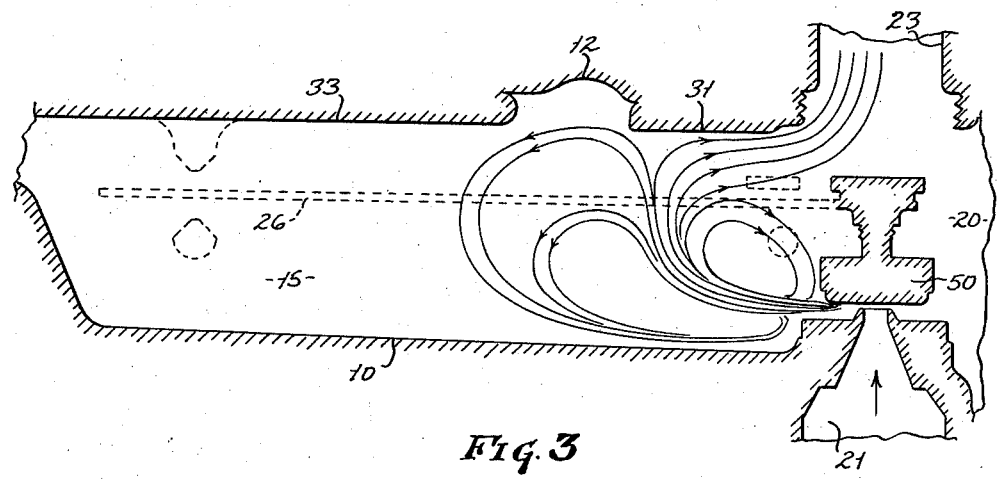

Nov. 25, 1941.  R. C. HUGHES  2,263,581
GAS REGULATOR
Filed Jan. 22, 1940   3 Sheets-Sheet 1
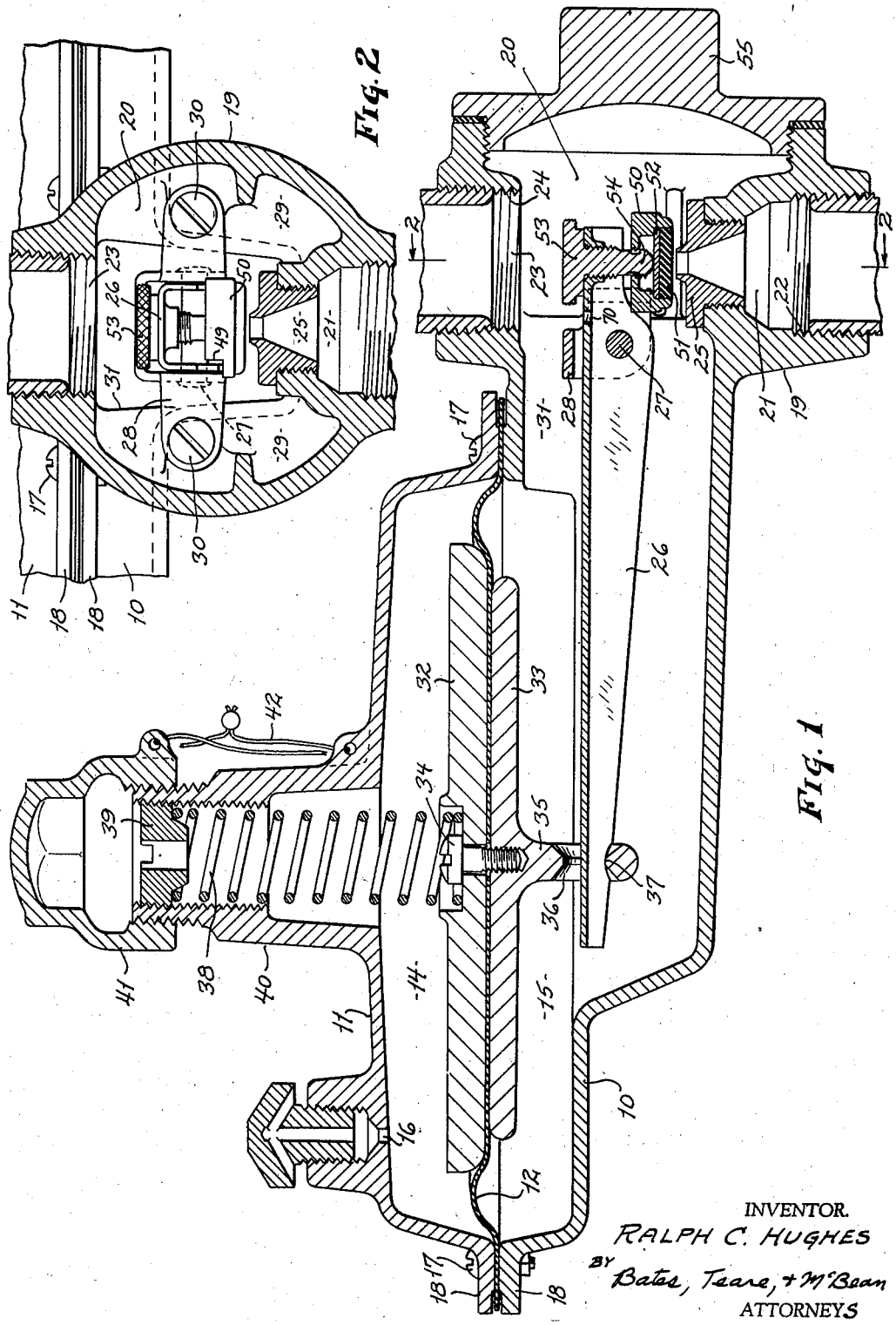
INVENTOR.
RALPH C. HUGHES
BY Bates, Teare, + McBean
ATTORNEYS Nov. 25, 1941.   R. C. HUGHES   2,263,581
GAS REGULATOR
Filed Jan. 22, 1940   3 Sheets-Sheet 2

INVENTOR.
RALPH C. HUGHES
BY Bates, Teare, & McBean
ATTORNEYS

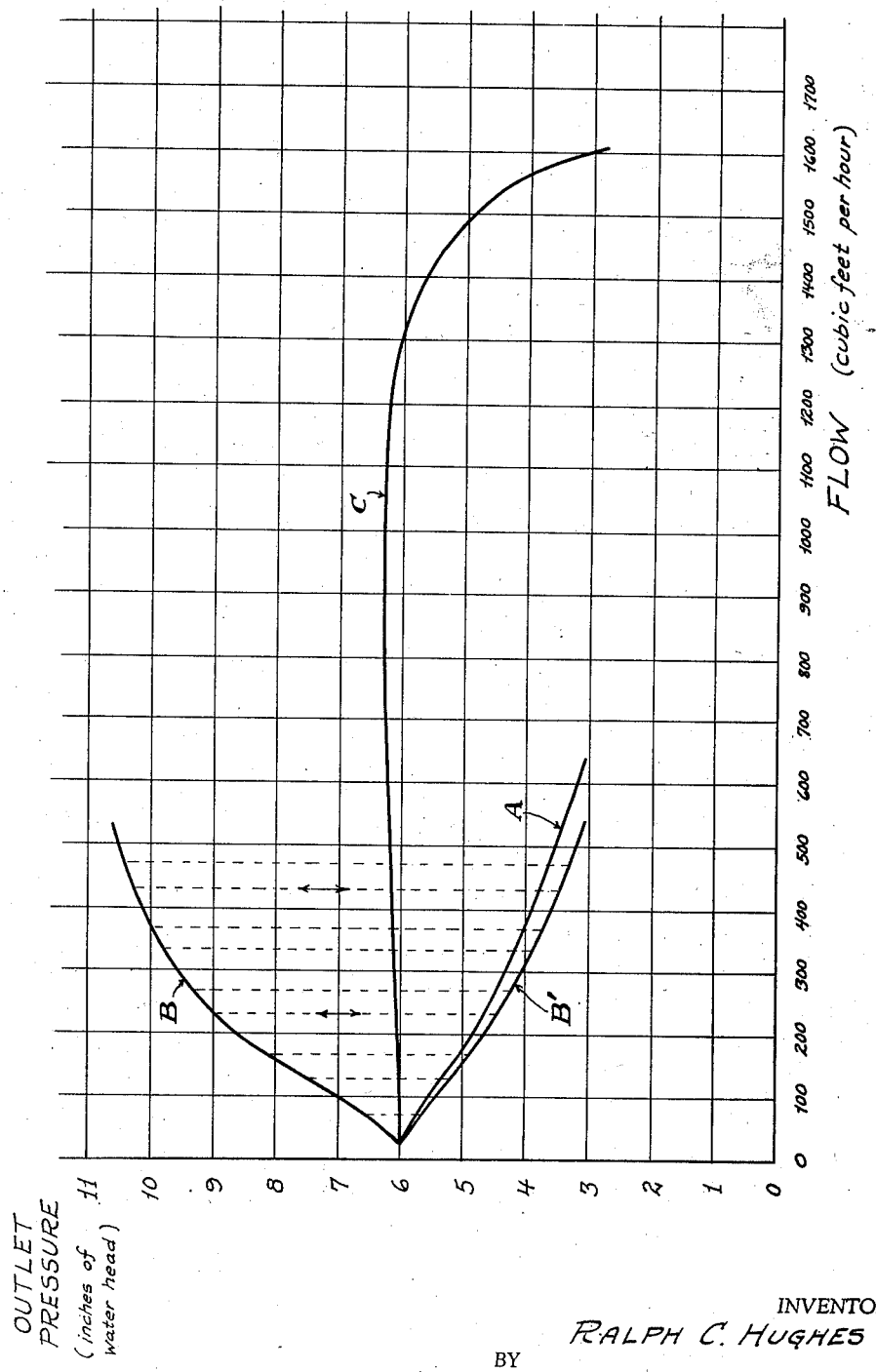

Patented Nov. 25, 1941

2,263,581

UNITED STATES PATENT OFFICE 2,263,581

GAS REGULATOR

Ralph C. Hughes, Anderson, Ind., assignor to Reynolds Gas Regulator Company, Anderson, Ind., a corporation of Indiana Application January 22, 1940, Serial No. 314,924

8 Claims. (Cl. 50—26)

This invention relates to a fluid pressure regulator and more particularly to that type of pressure regulator which is especially adapted for use as a service pressure regulator in a system supplying gas to different household or industrial gas burning appliances to maintain a substantially uniform pressure on the appliances. Generally, such regulators comprise an elongated casing, the lower section of which provides a gas chamber. At one end of this gas chamber there is a valve chamber having a gas inlet above and in registration with which is a gas outlet. A weighted or spring loaded flexible diaphragm is clamped in place on the lower section of the casing by an upper casing section, while a horizontal lever extends lengthwise of, and is pivoted intermediate its ends to the lower casing section. One end of this lever is operatively connected to the diaphragm, while the other end carries a valve which coacts with the gas inlet to control the flow of gas through the casing. Thus the valve is responsive to the fluctuation of the diaphragm, one side of which is exposed to the gas pressure in the lower casing section and the other side of which is exposed to atmospheric pressure in the upper casing section.

Fluid pressure regulators of this general type used in the past have had several disadvantages. For instance, the pressure at the outlet side of the regulator has been found to drop as the volume or rate of flow of gas through the regulator increased, due to an increase in demand at the appliances serviced by the regulator. Further, such regulators have been found to pump, that is, the pressure at the outlet side of the regulator fluctuates between an abnormally high pressure and an abnormally low pressure. For example, a gas regulator adjusted for a predetermined outlet pressure, such as a 5 inch water head has been found to pump or have a fluctuating outlet pressure varying from approximately zero to over 20 inches of water head pressure. Likewise, the capacity of regulators of this general type used in the past, in terms of cubic feet per minute of gas flowing through the outlet, has been relatively small, and the range of the capacities which could be handled by a single regulator has been limited.

One of the objects of the present invention is to provide a pressure regulator of the general type above mentioned, which regulator will be so arranged and constructed as to materially increase the capacity of the regulator relative to regulators of similar types and sizes used in the past, and at the same time increase the range of capacities over which the regulator is effective.

A further object of this invention is to provide a fluid pressure regulator of the type above mentioned, which regulator will provide a substantially constant and uniform flow of gas without attendant fluctuation in the outlet pressure, or attendant pumping actions.

I have found that one of the most serious disadvantages of gas regulators heretofore used has been the fact that as soon as an increased demand for a greater rate of flow of gas through the regulator was made, such demand immediately lowered the pressure under the diaphragm of the regulator and caused the regulator valve to open and admit more gas into the regulator. I have found that this increase of flow of gas into the regulator has caused the regulator valve member to be responsive, not to the pressure at the outlet side of the regulator, but rather to a combination of such outlet pressure and the volume of gas flowing through the regulator. Likewise as the volume of gas flowing through the regulator was increased, the valve member became more and more responsive to such volume. Indeed, the initial increase in the volume of gas flowing through the regulator caused the outlet pressure to drop materially and the continuance of such increase sometimes imparted a closing action to the valve despite the fact that the pressure at the outlet side of the regulator dropped. Inasmuch as the capacity of a regulator is fixed by the flow in cubic feet which may pass through the regulator at a predetermined minimum outlet pressure, the above mentioned outlet pressure drop limited the capacity of the regulator. Thus, instead of providing a constant pressure at the burners of the appliances, such pressure regulators served to prevent an excess pressure, that is, to prevent pressures above that for which the regulator was initially adjusted.

In the past, attempts have been made to overcome the pressure drop mentioned above. One method used to overcome such disadvantage was to arrange a spring or counter-weight to supplement the action of the diaphragm in opening the valve member of the regulator with a force which increased in magnitude as the valve member opened. Such methods have been of little or no value, because they did not make the regulator responsive to the outlet pressure but brought new factors into play, namely, the varying force of the spring or weight. I have also found that, when regulators using such springs or counter-weights were adjusted when the inlet pressure was high, and such inlet pressure subsequently dropped, the varying spring or counter-weights sometimes opened the regulator inlet valve wide for relatively small flow demands, resulting in outlet pressures above the predetermined maximum for which the regulator was set, thus making the use of such regulators dangerous.

Another method used in the past to overcome the disadvantageous pressure drops caused by increased flow demands, has been to provide what is known as an ejector action regulator. Ejector actions in pressure regulators have been accomplished by surrounding the valve member and the regulator inlet orifice with a tube or housing, extending upward from the regulator body in axial alignment with the inlet opening to a point above the lower surface of the valve member so that all gas entering the regulator had to flow between the valve member and the internal wall of the tube. To insure an ejector action by this method, the distance between the tube and valve member was made so small that the result was the creation of high back pressures adjacent the regulator inlet. These back pressures together with the surface friction of gas on the closely adjacent surfaces materially decreased the flow of gas through the regulator and generally resulted in a material decrease in the capacity of the regulator.

Other ejector action regulators have been provided in which a jet action is produced at the regulator outlet, which jet action increased in magnitude as the flow of gas through the regulator increased due to an increased demand. In some instances this has been accomplished by rounding the bottom corners of the valve or by using conoids having rounded bottom corners as valve members. In such regulators, the increase in the magnitude of the jet action at the regular outlet, increased the tendency of the regulator to pump. In many instances such regulators pumped to such an extent that the regulators were effective for only comparatively small flow demands.

I have found that this increase in the tendency of ejector and jet action types of regulators to pump is because the ejector or jet action acts to draw the gas from beneath the diaphragm and carries it out of the regulator with the jet or ejector stream, causing a rapid drop in pressure beneath the diaphragm which opens the inlet valve wide, admitting a far greater volume of gas into the regulator than is demanded by the appliances with which the regulator is being used. This results in a rapid increase of pressure under the regulator diaphragm causing the regulator valve to close. However, the demand quickly dissipates the excess pressure in the regulator outlet line, opening the inlet valve, again setting up the jet action and quickly causing the evacuation of the diaphragm chamber, whereupon, another pumping cycle takes place. Indeed, it has been found that these cycles take place several times a second, and that during the pumping, the minimum outlet pressure decreases and the maximum outlet pressure increases as the demand for increased outlet flow increases. An interruption in the flow of gas at the appliance even though for a brief interval is apt to cut the flame and become dangerous, therefore, for practical purposes, the minimum pressure during the pumping action of the regulator controls the capacity of the regulator, hence, the capacity of a pumping regulator is comparatively low.

Pressure regulators of this type not only perform their function when gas is flowing through the regulator to an appliance but also when the appliances are out of service and no gas is flowing. Under this latter condition the regulator should entirely stop the flow of gas into the regulator casing. A slight seepage of gas into the regulator when there is no flow to the appliance slowly builds up the outlet pressure to a pressure equaling the inlet or main line pressure and such a pressure at an appliance is dangerous. This requires the use of comparatively strong valve members having sufficient body to withstand comparatively high closing pressures, and further has encouraged the use of valve members having resilient or comparatively soft seat contacting faces such as leather, rubber, or composition materials. Such seat contacting surfaces have been removably mounted in the valve and considerable attention has been given to ways and means for removably mounting the valve on the actuating lever, so that such valve could be removed from the regulator without dismantling the entire regulator or removing it from the service lines, and the seat contacting surface thereof replaced. These factors have caused the use of comparatively large valve members, indeed it has been found expedient to use a valve member approximately seven-eighths of an inch in diameter and about one inch in height to provide sufficient strength and facilitate replacement thereof as above mentioned.

I have found that in regulators of the type with which this invention is particularly concerned, using valve members of the type used in the past and being of sufficient size to provide the required strength and facilitate their removal as above pointed out, the gas stream entering the inlet impinged against the bottom or seat engaging face of the valve member and flows outwardly with considerable force, and created a low pressure area adjacent the junction of the side wall and seat engaging face of the valve member, while the demand for gas by the appliance created a low pressure at the outlet opening of the regulator. These two low pressure areas diverted the outwardly flowing stream of gas upwardly and inwardly and split the inwardly flowing stream into two separate streams, one flowing upwardly to the regulator outlet, and the other an eddy current flowing downwardly along the side wall of the valve member until it impinged upon the stream of gas flowing from beneath the valve member, materially retarding and restricting the flow of gas into the regulator and thus restricting the volume of gas flowing through the regulator and limiting its capacity. I further find that this eddy current took place unless the surrounding chamber walls were so close to the valve member that the walls themselves restricted the flow of gas as heretofore mentioned in connection with the ejector type of regulator.

A further object of this invention is to provide a pressure regulator, with a valve member so shaped as to prevent undue ejector or jet action, eliminate the building up of excess pressure beneath the regulator diaphragm, and prevent eddy currents from restricting the volume of gas flowing into the regulator, thus increasing the capacity of the regulator without increasing its size and without increasing the tendency of such regulator to pump.

Other objects and features of this invention together with the advantages thereof will become more apparent from the following description which refers to a preferred embodiment illustrated in the accompanying drawings. The essential features of the invention will be summarized in the claims.

Figure 4:
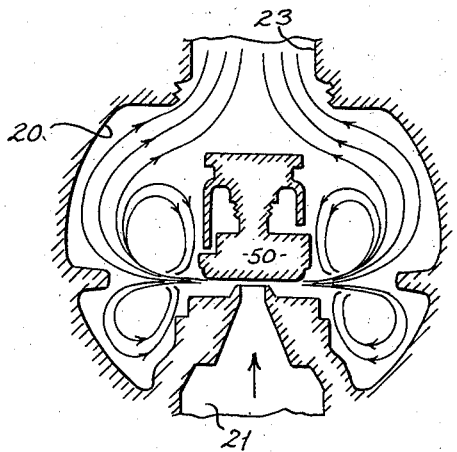
Figure 5:
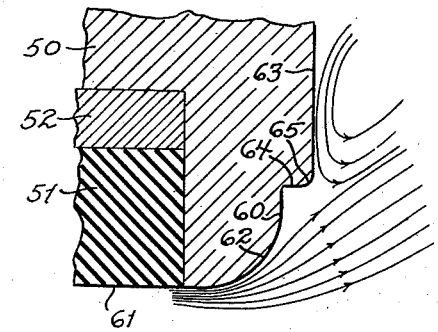

Referring now to the drawings, Fig. 1 is a vertically extending centrally located section taken through a fluid pressure regulator embodying the present invention; Fig. 2 is a transverse section as indicated by the lines 2—2 on Fig. 1; Figs. 3 and 4 are diagrammatic sections taken in substantially the same planes as Figs. 1 and 2, respectively, illustrating the improved valve member of my invention and the flow lines resulting from the use thereof; Fig. 5 is a fragmentary section of the improved valve member on an enlarged scale, the flow lines resulting from the use thereof, being also illustrated; Fig. 6 is a diagram or chart illustrating the relative capacity and outlet pressures of the regulator embodying the present invention.

Referring now to the drawings and especially to Fig. 1, the invention is illustrated in connection with a fluid pressure regulator which is especially adapted to be interposed between a gas supply main and a household or industrial service line to maintain a pressure in the service lines which is low in comparison with the pressure in the supply main. The regulator comprises a horizontally extending casing having a dish-shaped or hollow lower section 10 and an inverted dish-shaped or hollow upper section 11. Interposed between the two casings and retained in place therebetween is a substantially circular flexible diaphragm 12 which divides the casing into an upper chamber 14 and a lower chamber 15. The upper casing section 11 is provided with a passageway 16 communicating with the exterior of the casing, whereby the pressure in the chamber 14 is equal to atmospheric pressure. The casing sections 10 and 11, as well as the diaphragm 12 are secured together by bolts 17 passing through flanges 18 of the respective casing sections between which the periphery of the diaphragm is clamped. The lower casing section 10 is provided with an extension 19, at one side thereof, providing a valve chamber 20. The lower surface of this chamber 20 is provided with an inlet opening 21, threaded as at 22 to facilitate the attachment of the regulator to the supply main. Spaced above the inlet opening 21 and in axial alignment therewith, is an outlet opening 23, also threaded as at 24 for attachment of the service lines leading to the consumer's meter or appliance with which the regulator is to be used.

The inlet opening 21 is preferably provided with a valve seat member 25 which rises above the bottom wall of the valve chamber as shown in Figs. 1 and 2. The flow of gas through the valve seat member is controlled by a valve member 50 which is carried at one end of a lever 26 as will be hereinafter more fully described. This lever is pivotally mounted on a pin 27 carried by a bracket 28 which is secured to the inner wall 29 of the valve chamber by screws 30. The valve lever 26 extends through an enlarged opening 31, or passageway between the chamber 20 and 15, to a point below the center of the diaphragm.

The valve lever is connected to the diaphragm 12 to cause the valve to be moved toward and from its seat in response to the fluctuation of the diaphragm. As shown in Fig. 1, the diaphragm 12 is clamped between a pair of plates or weights 32 and 33 by a screw 34. The lower weight 33 lies within the pressure chamber 15 and is provided with a depending ear 35 having an opening 36 through which the end of the valve lever 26 extends. The inner surface of this ring is preferably provided with a relatively narrow arcuate lever engaging surface 37 to facilitate the rocking movement of the lever. The arrangement is such that the gas pressure against the lower surface of the diaphragm rocks the valve 50 into contact with the valve seat 25 closing the valve.

The valve is opened to admit gas into the valve chamber by the pressure of the weights 32 and 33 which may be supplemented if desired, by a spring to enable the desired outlet pressure to be adjusted from the exterior of the valve. Such a spring is shown at 38 in Fig. 1, as being a coil spring having one end engaging the upper weight 32 and the other end engaging a nut 39 adjustably mounted in an upward extending tubular portion 40 of the casing section 11. The casing extension 40 permits the use of a comparatively long spring so that its pressure against the upper diaphragm plate 32 will be substantially constant despite the up and down movement of the diaphragm under the impulse of the gas pressure in the chamber 15. The casing extension 40 is provided with a removable cap 41 which may be sealed in place to prevent tampering with the spring adjustment by a wire seal indicated at 42.

The pressure regulator above described is comparatively well known in the art and is similar in many respects to that shown in Patent No. 2,115,580 issued to my assignee Reynolds Gas Regulator Co., April 26, 1938. The operation of such a regulator is as follows. The weights 32 and 33 together with the spring 38 act to move the valve member away from the inlet seat 25 whereupon the gas from the supply main is admitted into the chambers 20 and 15. As the chamber 15 fills with gas, the pressure thereof against the lower face of the diaphragm 12 and weight 33 raises the diaphragm, moving the valve member 50 toward its seat and stopping or reducing the flow of gas into the regulator. The desired result is to secure a constant, predetermined, reduced pressure at the regulator outlet regardless of the demand on the regulator by the appliances for gas, and to entirely stop the flow of gas into the regulator when there is no flow of gas from the regulator to the appliances serviced thereby, thus preventing at all times an excess pressure at the appliance.

The stoppage of the flow of gas into the regulator, when there is no gas flowing from the regulator to the appliance, is insured by the rigidity of the valve and valve supporting structure, together with the use of a rubber or composition seat contacting member in the valve. In the drawings and especially Figs. 1 and 2, the valve lever 26 is shown as being an inverted channel, thus providing a rigid structure. The valve member 50 comprises a cylindrical metallic member in the bottom surface of which is inset a rubber or composition seat contacting member 51. As shown in Fig. 1, a metallic disc 52 is positioned within the valve member to support the member 51. A valve mounting screw 53 is adjustably and removably mounted in the lever 26. The lower end of this screw has a threaded portion 54 which passes entirely through the valve bringing a reduced cross sectional area of the screw into registration with the opening in the valve and the end of the screw into contact with the bearing disc 52. The valve member is provided with a flattened side surface 49 which coacts with one flange of the lever 26 to prevent any substantial rotation of the valve member. Thus, it will be seen that the structure provides an arrangement which facilitates complete shutoff of gas flowing into the regulator.

From the above description, it will be seen that the valve may be removed from the valve lever by removing the mounting screw 53, the knurled head of the screw facilitating such operation. The wall of the valve chamber 20 is provided with a removable plug 55 to permit removal of the valve without disconnecting the regulator from the service and supply means.

In the past regulators of this type have been provided with cylindrical valve members in which the intersection of the bottom surface with the side wall formed a square corner. I have found that when a square cornered valve member is used the gas flows outwardly, with considerably force, from beneath the valve member substantially in a plane or planes parallel with the bottom surface of the valve, creating a low pressure area around the side wall of the valve adjacent such corner. At the same time, pressure at the outlet side of the valve chamber is reduced, due to the flow of gas to the appliance, causing the outwardly flowing gas stream to bend upwardly and inwardly toward the low pressure area at the outlet. A portion of this diverted stream of gas strikes the side wall of the valve and thereupon flows upwardly toward the low pressure area at the regulator outlet and the remaining portion flows downwardly along the side wall of the valve into the low pressure area adjacent the bottom of the valve member. This latter portion or eddy current impinges against the stream flowing outwardly from the regulator inlet. I have found that this eddy current increases in magnitude, that is, both the volume and the force of this eddy current increase as the rate of flow of gas through the regulator increases, and that the impingment of this eddy current on the stream of gas flowing outward from beneath the valve, creates a back pressure which has a restricting effect on the stream of gas flowing from beneath the valve and thereby reduces to volume of gas flowing into the regulator and therefore reduces the capacity of the regulator.

To overcome this disadvantage, I have provided a valve member, the contour of which eliminates the restricting effect of this eddy current. As illustrated, the lower portion of my improved valve member has an annular shoulder 64. This shoulder is provided by making the upper portion of the valve of a greater diameter than the extreme lower portion thereof, as is shown in Figs. 1 and 5, at 60. The side wall of this reduced portion of the valve is joined to the planar bottom surface 61 of the valve by a quadrantally rounded or smoothly curved surface 62. The corner between the upper side wall 63 of the valve and the horizontal wall or shoulder 64 is also rounded as indicated at 65. I have found that this construction permits the stream of gas flowing outwardly from beneath the valve member to expand and reduces to pressure differential between it and the area adjacent the lower portion of the side wall of the valve. The downwardly flowing eddy current indicated at A in Fig. 5 then is of reduced strength and volume and in addition leaves the side wall of the valve and flows outwardly and upwardly joining with or flowing parallel with the main stream without producing a restricting effect on such main stream B which flows outwardly and upwardly from beneath the valve. The interruption in the coutour of the valve made by the offset or shoulder 64 together with the curved surface 62 reduces the volume of the eddy current A, and thereby minimizes the restricting effect of such current on the main stream B, while these combined with the curved surface 65 eliminate such restricting effect.

As will be seen from the drawings, and especially from Figs. 3, 4 and 5, the improved valve, while it avoids the restricting effect of the eddy currents as above described, does not weaken the valve or valve supporting lever structure and hence, the valve is effective to stop all flow into the regulator. Further the improved valve does not create an ejector action, that is the gas does not pass upward along the side wall of the valve in a thin tubular stream, such as might evacuate the chamber under the diaphragm and cause the pumping action heretofore described. Instead, the gas flows outwardly away from the valve member, expanding as it flows, thus utilizing the valve chamber 20 as an expansion chamber making the outlet pressure comparatively constant. By using the chamber as an expansion chamber, the tendency for high or inlet pressures to enter the diaphragm chamber is also decreased materially, which factor also increases the capacity of the regulator.

I have found that with a $\frac{1}{16}$ inlet orifice, a valve member $\frac{7}{8}$ inch in diameter with an annular shoulder 64 of about $\frac{1}{32}$ inch positioned about $\frac{1}{32}$ of an inch above the bottom surface of the valve provides construction which materially increases the capacity of the regulator and gives comparatively constant outlet pressures.

It will be noted in the construction shown, the valve supporting lever is of considerable width. However, as the gas flowing outward from beneath the valve flows radially and upwardly expanding as it flows, this comparatively great width has little effect upon the operation of the valve. This is due to the construction of the valve which permits an increasing expansion of the gas as it leaves the valve. However, such effect as it may have is reduced to a minimum and for practical purposes eliminated by reason of the comparatively small area of the valve attaching screws 53 above the top of the valve which permits gas striking the lever to flow in both directions therealong and by an opening 70 in the lever 26 (Fig. 1), which permits the gas to flow therethrough directly into the outlet.

In Fig. 6, there is illustrated a chart, which indicates the relative high capacity of my improved regulator. In this chart, the horizontal units indicate the flow of gas through the regulator outlet in terms of cubic feet of gas per hour, and the vertical unit represents the regulator outlet pressure in inches of water head. In this chart, the curve A represents the performance of a similar regulator provided with a valve having a square bottom corner. It is to be noted that the outlet pressure drop is of considerable magnitude, and at approximately 500 cubic feet per minute, the pressure drops rapidly giving the minimum pressure or capacity limiting pressure of 3.2 inches of water head at about 520 cubic feet per minute. Curves B and B' illustrate the performance of an ejector type regulator. Two curves have been used to illustrate the performance of this regulator.

The curve B represents the maximum pressure and the curve B' the minimum pressure during the pumping cycles which occur many times a minute, making it impractical to plot the curve which in reality, would comprise a series of substantially vertically extending closely spaced lines running between the lines B and B'. Where the lines B and B' merge, but little pumping action was noted. It is to be observed, that the limiting pressure is reached at a flow of approximately 500 cubic feet per minute as indicated by the curve B'. While the maximum pressure rises to 10.5 inches of water head at the same flow. Both of these extremes obviously represent dangerous conditions, the former insufficient pressure and the latter an abnormally high pressure.

The curve C represents the performances of the improved structure. It is to be noted that the capacity limiting pressure of 3.2 inches of water head is not reached until the flow has reached approximately 1,600 cubic feet of gas per hour. Thus, the improved valve has a capacity of over three times that of the structures used in the past.

I claim:

1. In a pressure regulator of the character described, the combination with a casing providing a chamber, one wall of which comprises a pressure responsive diaphragm, said casing having a second chamber in communication with the first named chamber and provided with an inlet for gas under pressure and a gas outlet directly opposite the inlet, of a valve seat around the inner end of the inlet, a valve for controlling the flow of gas into the casing and being disposed between the inlet and the outlet and in spaced relation to the interior walls of the casing, said valve having a substantially flat seat engaging surface and a circumferential downwardly facing shoulder spaced above the bottom of said valve, the side wall of the valve below said shoulder being joined to the bottom surface of the valve by a smoothly curved surface, and a lever interconnecting the valve and diaphragm for moving the valve in response to the fluctuation of said diaphragm to and from the valve seat to regulate the pressure of the gas flowing out of the casing.

2. In a pressure regulator of the character described, the combination with a casing having in one portion thereof, a pressure responsive diaphragm adapted to fluctuate in response to changes in pressure within the casing and having in another portion thereof an inlet for gas under pressure and a gas outlet directly opposite the inlet, a valve for controlling the flow of gas into the casing and being disposed between the inlet and the outlet and in spaced relation to the interior walls of the casing, said valve having a substantially flat seat engaging surface terminating in an upwardly and outwardly curved surface interrupted by a shoulder extending outwardly in a plane substantially parallel with the bottom surface of the valve, whereby gas after striking the bottom surface of the valve will flow outwardly and upwardly expanding as it flows and then inwardly and upwardly toward said outlet, and a lever interconnecting the valve and diaphragm for moving the valve in response to the fluctuation of said diaphragm.

3. In a pressure regulator of the character described, the combination with a casing having in one portion thereof a diaphragm adapted to fluctuate in response to changes in pressure within the casing and having in another portion thereof an inlet for gas under pressure, and a gas outlet directly opposite the inlet, of means for forming a valve seat around the inner end of the inlet, a valve for controlling the flow of gas into the casing and being disposed between the inlet and the outlet and in spaced relation to the interior walls of the casing, said valve having a substantially flat seat engaging surface, the side wall of the valve being interrupted by a downwardly facing circumferential shoulder parallel with and spaced above the bottom of said valve, the side wall of the valve below said shoulder being joined to the bottom surface of the valve by a quadrantally curved or rounded surface, whereby gas after striking the bottom surface of the valve will flow outwardly and upwardly, and then inwardly and upwardly toward said outlet expanding as it flows, thereby creating an attendant drop in pressure between the inlet and outlet, and a lever interconnecting the valve and diaphragm for moving the valve in response to the fluctuation of said diaphragm to and from the valve seat to regulate the pressure of the gas flowing out of the casing.

4. In a pressure regulator of the class described, the combination with a hollow casing having a flexible diaphragm extending thereacross and separating the casing into upper and lower chambers, the lower part of the casing being provided with a hollow extension forming an expansion chamber, said expansion chamber being in communication with the lower chamber and at one side thereof, and being provided with axially aligned vertically spaced inlet and outlet openings, of a valve coacting with the inlet opening to control the passage of gas into the expansion chamber, a lever interconnecting the valve and diaphragm for moving the valve in response to the fluctuations thereof, said valve comprising a substantially cylindrical body positioned in axial alignment with the inlet and outlet openings and having a substantially planar bottom surface against which gas entering the inlet opening strikes, the lower portion of said valve having a reduced diameter relative to the upper portion forming a shoulder parallel with the bottom surface, the side walls of said reduced portion being connected to the bottom surface by a substantially quadrantally curved surface, wherein eddy currents set up within the expansion chamber will not exert a restricting influence on the gas flowing outwardly from beneath the valve member.

5. In a pressure regulator of the class described, the combination with a hollow casing having a flexible diaphragm extending thereacross and separating the casing into upper and lower chambers, the lower part of the casing being provided with a hollow extension forming an expansion chamber, said expansion chamber being in communication with the lower chamber and at one side thereof, said expansion chamber being provided with axially aligned vertically spaced inlet and outlet openings, of a valve coacting with the inlet opening to control the passage of gas into the expansion chamber, and a lever interconnecting the valve and diaphragm for moving the valve in response to the fluctuation of said diaphragm, said valve comprising a substantially cylindrical body positioned in axial alignment with the inlet and outlet openings and having a substantially planar bottom surface against which gas entering the inlet opening strikes, the lower portion of said valve having a reduced diameter relative to the upper portion forming a shoulder parallel with the bottom surface, the side walls of said reduced portion being connected to the bottom surface by a quadrantally curved surface, and the side wall of the enlarged portion being connected with the shoulder by a smoothly rounded surface whereby eddy currents within the expansion chamber, will not exert a restricting influence on the gas flowing outwardly from beneath the valve member.

6. In a pressure regulator of the character described, the combination with a casing having in one portion thereof, a diaphragm adapted to fluctuate in response to changes in pressure within the casing and having in another portion thereof, an inlet for gas under pressure and a gas outlet directly opposite the inlet, of means for forming a valve seat around the inner end of the inlet, a valve for controlling the flow of gas into the casing and being disposed between the inlet and the outlet and in spaced relation to the interior walls of the casing, said valve having a substantially flat seat engaging surface and a circumferential outwardly extending shoulder spaced above the bottom of said valve, the side wall of the valve below said shoulder being joined to the bottom surface of the valve by a smoothly curved or rounded surface, and the side wall of the valve above the shoulder being joined to the shoulder by a second smoothly curved or rounded surface, whereby gas after striking the bottom surface of the valve will flow outwardly and upwardly expanding as it flows with an attendant decrease in pressure and then inwardly and upwardly toward said outlet, and whereby the portion of the inwardly flowing gas striking the valve and flowing downwardly thereby will not restrict the flow of gas from beneath the valve, thus increasing the capacity of the regulator, and a lever interconnecting the valve and diaphragm for moving the valve in response to the fluctuation of said diaphragm to and from the valve seat to regulate the pressure of the gas flowing out of the casing.

7. In a gas regulator, a casing providing a pressure chamber, one wall of which is provided by a pressure responsive diaphragm, and an expansion chamber in communication with the pressure chamber and provided with spaced aligned inlet and outlet openings, a valve in said expansion chamber, means interconnecting said valve with said diaphragm, whereby said valve moves to and from the inlet opening in response to changes of pressure in said pressure chamber, said valve comprising a substantially cylindrical member having its axis in alignment with the axes of the inlet and outlet opening, and provided with a planar bottom surface, the lower portion of the valve being of a smaller diameter than the upper portion thereby providing a shoulder spaced above and parallel with the bottom surface of the valve, the distance of said shoulder from the plane of the bottom surface being substantially three times the width of said shoulder, wherein the bottom surface is joined to the side wall of the lower portion of the valve by a smoothly curved surface, and wherein the shoulder is joined to the upper portion of the valve by a second smoothly curved surface.

8. In a pressure regulator of the character described, the combination with a casing having in one portion thereof, a diaphragm adapted to fluctuate in response to changes in pressure within the casing and having in another portion thereof an expansion chamber provided with an inlet for gas under pressure and a gas outlet directly opposite the inlet, of means for forming a valve seat around the inner end of the inlet, a valve for controlling the flow of gas into the casing and being disposed between the inlet and the outlet and in spaced relation to the interior walls of the casing, said valve having a substantially flat seat engaging surface terminating in an outwardly and upwardly curving surface, said valve also being provided with a downwardly facing outwardly extending shoulder spaced above the bottom thereof, whereby gas after striking the bottom surface of the valve will flow outwardly and upwardly expanding as it flows and then inwardly and upwardly toward said outlet, and a lever having one end thereof connected to said diaphragm, and the other end extending over said valve, means to removably secure said valve to said lever, and wherein said lever is provided with an opening to permit gas striking said lever to pass therethrough without entering the area beneath said diaphragm.

RALPH C. HUGHES.